United States Patent [19]

Faccini

[11] 4,162,394
[45] Jul. 24, 1979

[54] AUXILIARY EVAPORATOR FOR DUAL MODE HEAT PIPES

[76] Inventor: Ernest C. Faccini, 32 Blair Ave., Rock Springs, Wyo. 82901

[21] Appl. No.: 815,063

[22] Filed: Jul. 12, 1977

[51] Int. Cl.² .................... F28D 15/00; H05B 1/00
[52] U.S. Cl. .................... 219/341; 165/45; 165/105; 219/274; 219/275; 219/326; 219/530
[58] Field of Search .......... 219/325, 326, 341, 271, 219/272, 273, 275, 279, 530, 540, 274; 165/45, 105

[56] References Cited

U.S. PATENT DOCUMENTS

| | | | |
|---|---|---|---|
| 2,155,261 | 4/1939 | Fiene | 165/105 X |
| 3,195,619 | 7/1965 | Tippman | 165/45 X |
| 3,431,396 | 3/1969 | Kodaira | 219/341 X |
| 3,682,239 | 8/1972 | Abu-Romia | 219/341 UX |
| 3,771,590 | 11/1973 | Best et al. | 165/45 X |
| 3,854,454 | 12/1974 | Lazaridis | 219/341 UX |

Primary Examiner—A. Bartis
Attorney, Agent, or Firm—Clarence A. O'Brien; Harvey B. Jacobson

[57] ABSTRACT

A dual mode heat pipe includes roadways, bridges, etc., includes an auxiliary evaporator formed concentrically with the upper end of a vertically disposed primary evaporator portion. The auxiliary evaporator portion comprises an annular sleeve disposed about the upper end of the primary evaporator portion and arranged between the primary evaporator portion and the condenser portion of the heat pipe such that all of the condensed working fluid returning to the primary evaporator portion must enter and overflow the auxiliary evaporator portion prior to return to the primary evaporator portion. The auxiliary evaporator portion is provided with heat input means whereby the auxiliary evaporator may function even in the absence of heat pipe function by the primary evaporator.

8 Claims, 4 Drawing Figures

AUXILIARY EVAPORATOR FOR DUAL MODE HEAT PIPES

BACKGROUND AND SUMMARY OF THE INVENTION

Dual mode heat pipes are used in a number of heating applications, such as heating of a concrete slab in a bridge or roadway. A liquid heat transfer medium or working liquid is evaporated in a primary evaporator portion of a sealed pipe or in both primary and auxiliary evaporator portions of the pipe. The energy-containing vapors move to a condenser or heat output portion of the pipe and are condensed therein. The sensible and latent heats of the vapors are transferred to the condenser portion and thus to the material (liquid, gas, or solid) surrounding the condenser portion by conduction and/or radiation. Heat energy from any source, such as solar, geothermal, electrical heating, flame, and the like, can be transferred essentially by conduction through the sealed walls of the evaporator portions of the heat pipe to heat and evaporate the working liquid. The primary evaporator of such a heat pipe is typically located in a "down pipe", that is, in a vertically oriented cylindrical portion of the heat pipe. The primary evaporator is located effectively below the condenser portion of the heat pipe and the condenser portion usually is located in a cylindrical portion of the heat pipe which is disposed at approximately a right angle to the "down pipe". The energy-containing vapor thus moves upwardly from the relatively hot primary evaporator into the relatively cool condenser portion where condensation of the vapor and heat transfer occurs. The condensate returns by gravity flow or by the capillary action of a wick to the "down pipe".

Auxiliary evaporators have previously been incorporated into such heat pipes to increase the total energy provided to the condenser portion of the heat pipes. Such heat pipes with an auxiliary evaporator are termed "dual mode" heat pipes. The auxiliary evaporators of prior heat pipes are typically located essentially in the condenser portion of the pipe and immediately below said condenser portion. Maintenance of the auxiliary evaporator is therefore a problem especially when the condenser portion of the heat pipe is located internally of a concrete slab, such as in the decking of a bridge. Further, the application of energy to the external surfaces of such auxiliary evaporators is often a problem and certain energy sources are not directly utilizable. Performance of auxiliary evaporators so disposed invariably degrades with time unless the primary evaporator continually functions. Since the vapors condense along the full length of the condenser portion, at least a portion of the working liquid is lost to the primary evaporator, with the effect of the auxiliary evaporator eventually "drying up" unless the primary evaporator functions for at least a certain determinable amount of time.

The deficiencies of prior dual mode heat pipes are obviated by the present structure. The heat is not only capable of indefinite operation through sole operation of the auxiliary evaporator, but is also capable of utilizing a wider variety of energy sources. The present heat pipe apparatus is also more easily maintained and is useful in situations where more than one energy source is available for utilization. The total amount of energy available to the condenser portion of a heat pipe is therefore increased.

The present dual mode heat pipe disposes the auxiliary evaporator coaxially of the primary evaporator at a portion thereof near the interface between the evaporator portion and the condenser portion of the heat pipe. As an example, in the heat pipes commonly used to heat the decking of bridges the evaporator portion is located within the "down tube" as aforesaid and the condenser portion is located in a cylindrical portion of the heat pipe relatively higher than and disposed at a right angle to the "down tube". The present auxiliary evaporator is located below the right-angle bend in the heat pipe and effectively above the primary evaporator. The auxiliary evaporator comprises an annular sleeve concentrically enclosing the upper end of the tubular primary evaporator. The annular sleeve of the auxiliary evaporator extends to form the condenser portion of the heat pipe. All of the condensed working liquid returns first by gravity or capillary action to the auxiliary evaporator. Liquid feed to the primary evaporator then occurs due to overflow of working liquid from the auxiliary evaporator into the upper end of the tubular primary evaporator. The present auxiliary evaporator is therefore an integral part of the "down tube" of the heat pipe. The auxiliary evaporator of the present invention is therefore not susceptible to "drying out" and can continue to function even in the absence of heat pipe function by the primary evaporator.

Accordingly, it is an object of the invention to provide a dual mode heat pipe wherein the auxiliary evaporator comprises an annular sleeve disposed concentrically and outwardly of the upper end of the "down tube" of the primary evaporator so that, condensed working liquid returns first to the auxiliary evaporator and then flows into the primary evaporator.

It is another object of the invention to provide a dual mode heat pipe wherein the auxiliary evaporator is positioned for easy maintenance thereof and more ready utilization of available energy sources.

These and other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
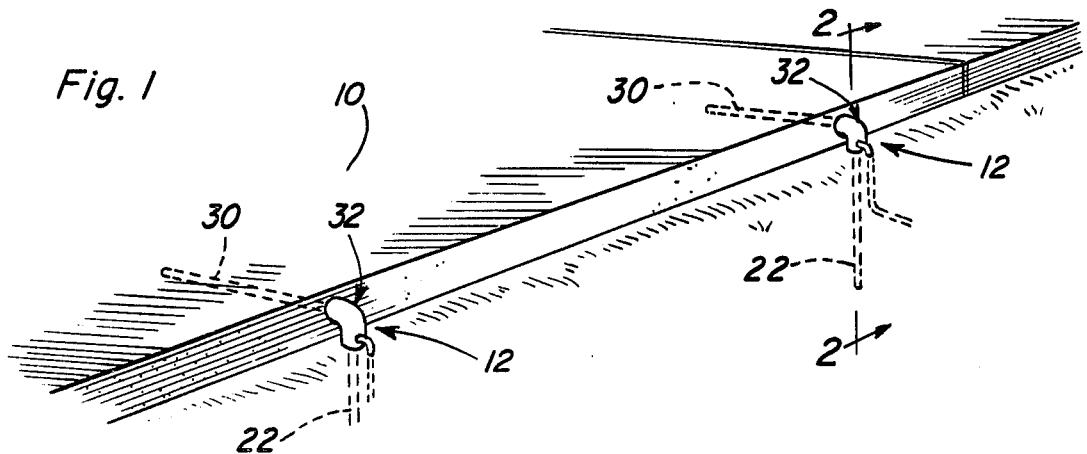
FIG. 1 is a perspective view of an operational environment of the present dual mode heat pipe.

Referring now to FIG. 1, a concrete decking 10 of a bridge or the like is seen to be provided with spaced heat pipes 12. The heat pipes absorb energy at heat input portions 22 externally of the decking 10 and transport major portions of the absorbed energy to heat output portions 30 disposed internally of the decking 10. Heat transported from the output portions 30 of the heat pipes 12 to the decking 10 warms the decking to prevent formation of ice on the upper surface thereof, thereby preventing the occurrance of hazardous traffic conditions.

Figure 2:
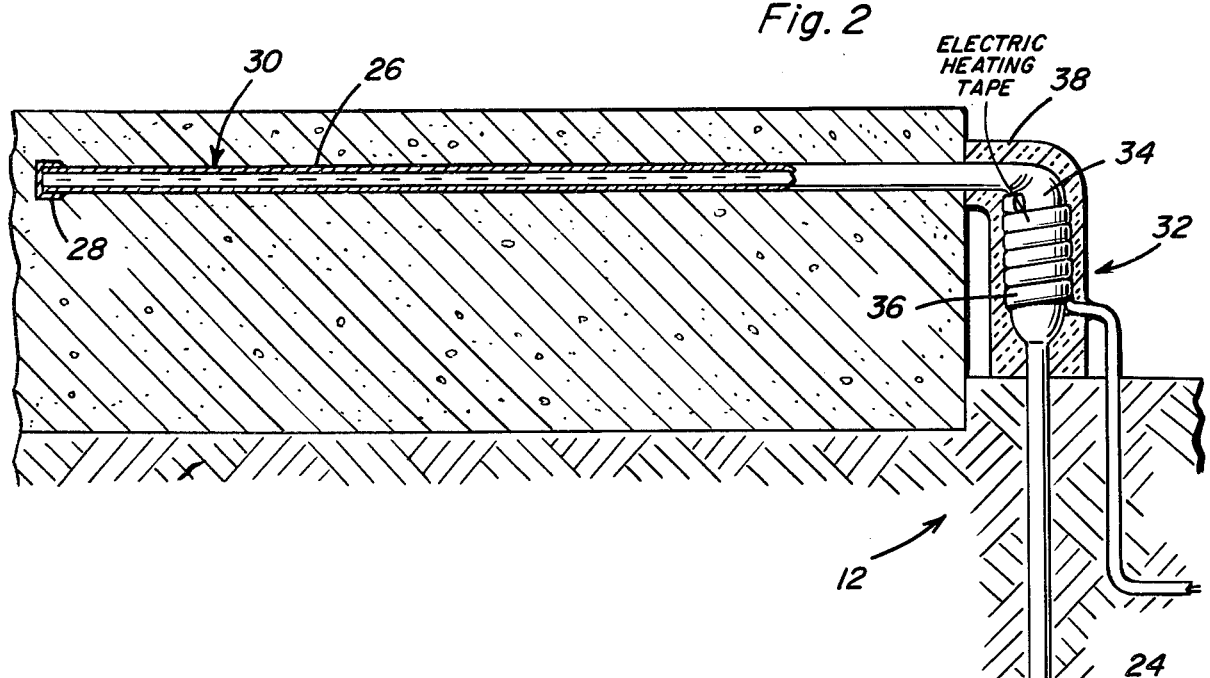
FIG. 2 is a section taken along line 2—2 of FIG. 1.

As is more clearly seen in FIG. 2, each heat pipe 12 comprises an elongated vertical tube 18 sealed at its outer end 20, with the tube 18 essentially comprising the heat input primary evaporator portion 22 which is referred to in the art as the "down tube" of the heat pipe. The tube 18 can be received within a supporting structure 24 adjacent to and conveniently mounting the decking 10, and energy is applied to the external surfaces of the tube 18 in a known manner to heat a working fluid disposed internally thereof as a liquid in order to vaporize the liquid. The vaporized working fluid rises within the tube 18 and enters an elongated horizontal tube 26 which communicates with the vertical tube 18 and is disposed at approximately a right angle thereto. The tube 26 is also sealed at its outer end 28, the heat pipe 12 thereby being completely sealed from ambient as is known in the art. Major portions of the horizontal tube 26 essentially comprise the heat output condenser portion 30 of the heat pipe 12, with the energy-containing vaporized working fluid entering the tube 26 being condensed therein, and the sensible and latent heats of the fluid being thus transferred to the walls of the tube 26 and subsequently to the decking 10 by conduction in order to warm the decking. The condensed working fluid returns to the heat input portion 14 of the heat pipe 12 either by gravity flow or by provision of a wick (not shown) within the tube 26. The use of a wick, which is well known in the art, is not necessary in the tube 26. If a wick is used, a fiber material formed as a sleeve contiguous to the inner walls of the tube 26, scorings in the inner walls of the tube 26, or a number of other means can be employed to produce the desired liquid transport.

Figure 3:
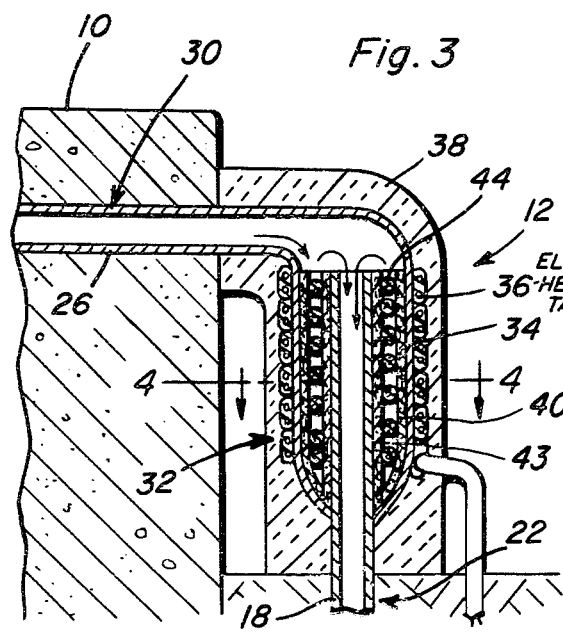
FIG. 3 is a detail section of the auxiliary evaporator of the invention.
Figure 4:
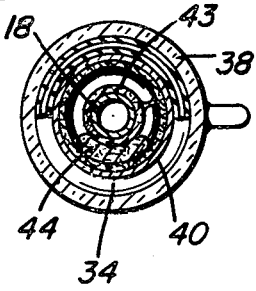
FIG. 4 is a section taken along line 4—4 of FIG. 3.

As seen in FIGS. 2–4, an auxiliary evaporator portion 32 of the heat pipe 12 is seen to be formed at the upper end of the vertical tube 18 above the primary evaporator portion 22. The auxiliary evaporator portion 32 comprises an annular sleeve 34 which tapers at the lower end to an inner diameter equal to the outer diameter of the vertical tube 18 and which is sealed at the mutually contacting portions between the sleeve 34 and the tube 18. As best seen in FIG. 3, the annular sleeve 34 is a continuation of the inner end of the horizontal tube 26, with the longitudinal axis of the sleeve 34 being disposed at approximately a 90 degree angle to the longitudinal axis of the tube 26. The upper end of the vertical tube 18 extends into the sleeve 34 concentrically thereof essentially the full length of said sleeve and the annular space between the sleeve 34 and the tube 18 is at least partially filled with a working fluid which is heated through the walls of the sleeve by an energy source, such as electrical tape heating elements 36 which are wrapped about the external surface of the sleeve 34 to transfer energy therethrough to the working fluid. Energy could be transferred through the walls of the sleeve 34 into the auxiliary evaporator portion 32 from energy sources of varying nature including solar, geothermal, heated liquids circulating through tubing coiled about the sleeve 34, and the like. An insulative cover 38 can be employed to enclose the auxiliary evaporator portion 32 to minimize heat loss.

The sleeve 34 has a wick 40 disposed contiguously to the inner wall thereof, the wick 40 acting in a known manner to transport the condensed working fluid downwardly within the auxiliary evaporator portion 32 and to maintain the fluid in thermal contact with the walls of the sleeve. A wick 43 is also disposed on the outer wall surfaces of the upper end of the vertical tube 18. The wicks 40 and 43 also prevent "hot spots". The inner walls of the vertical tube 18 can also have a wicking material disposed along the length thereof or along selected portions thereof, the wicking function being provided by scoring, a sleeve of fibrous material, or the like. A helical coil 44 can also be provided within the annular space between the sleeve 34 and the upper end of the tube 18, the coil 44 being formed of a fibrous material. The coil 44 acts to maintain the wicks 40 and 42 in place and aids the homogenous distribution of the working fluid within the auxiliary evaporator portion 32.

Heat energy applied to the walls of the sleeve 34 by the heating elements 36 is transferred to the working fluid to vaporize said fluid and cause energy-containing vapor to rise into the condenser portion 30 of the heat pipe 12 in the same manner as vaporized working fluid is caused to move into the condenser portion 30 from the primary evaporator portion 22, the vaporized working fluid from both the auxiliary evaporator portion 32 and the primary evaporator portion 22 condensing in and giving up heat to the walls of the condenser portion 30 to heat the decking 10. The use of the auxiliary evaporator portion 32 allows an increase in the heat output from the output portion 16 of the heat pipe.

The condensed working fluid, as clearly seen in FIG. 3, flows along the inner walls of the nearly horizontal tube 26 and into the annular space between the sleeve 34 and the upper end of the vertical tube 18. The working fluid returning to the primary evaporator portion 22 overflows into the upper end of the tube 18, and all of the working fluid returning to the primary evaporator portion 22 first passes through or by the auxiliary evaporator portion 32. Thus, the auxiliary evaporator portions 32 is not subject to drying out in the absence of adequate heat pipe operation of the primary evaporator portion 22 of the heat pipe 12 and the auxiliary evaporator portion 32 is capable of continued indefinite operation even in the absence of operation by the primary evaporator portion 22.

Relative to prior dual mode heat pipes, the present heat pipe 12 allows ready access to the auxiliary evaporator portion 32 for maintenance. The ability of the auxiliary evaporator portion 32 to continue operation results from the coaxial disposition of the portion 32 with the tube 18 of the primary evaporator portion 22 at the upper end of the tube 18. The location of the auxiliary evaporator portion 32 also enables direct use of a number of energy sources not readily utilizable with prior heat pipe structures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Heat pipe apparatus comprising means containing a condensable working fluid and having a vertically disposed energy input portion and an energy output portion, the energy output portion including a condenser portion in which the working fluid condenses to release heat, the condensed working fluid returning to the energy input portion for vaporization by energy applied to the input portion externally thereof, the energy input portion comprising:

primary evaporator means comprising a tubular member sealed at one end and open at its other end for containing at least a portion of the working fluid, at least a portion of the working fluid being vaporized therein; and auxiliary evaporator means comprising a tubular sleeve disposed in concentrically spaced relationship about the open end of the tubular member, said tubular sleeve having a closed end portion sealed to the outer wall surfaces of the tubular member whereby a condensate receiving space is defined between the inner wall surfaces of the tubular sleeve and the outer wall surfaces of the tubular member, and the other end of said tubular sleeve extending upwardly of the open end of the tubular member and being in communication with said condenser portion for containing a portion of the working fluid and being disposed between the condenser portion and the primary evaporator means, said auxiliary evaporator means being so constructed and so arranged relative to said primary evaporator means that all of the condensed working fluid returning to the energy input portion enters the auxiliary evaporator means prior to return of a portion thereof to the primary evaporator means, said auxiliary evaporator including a heat producing means for supplying heat thereto.

2. The heat pipe apparatus of claim 1 wherein the tubular sleeve is extended to define the condenser portion of the energy output portion.

3. The heat pipe apparatus of claim 2 wherein the portion of the tubular sleeve defining the condenser portion of the energy output portion is disposed relatively above that portion of the tubular sleeve defining the auxiliary evaporator means.

4. The heat pipe apparatus of claim 1 and further comprising wick means formed on the inner walls of the tubular sleeve surrounding the tubular member for transport of the working fluid within the auxiliary evaporator means.

5. The heat pipe apparatus of claim 4 and further comprising second wick means formed on the outer surface of the end of the tubular member surrounded by the tubular sleeve for transport of the working fluid within the auxiliary evaporator portion.

6. The heat pipe apparatus of claim 5 and further comprising a helical coil formed of capillary material disposed within the space between the tubular sleeve and the end of the tubular member surrounded by the tubular sleeve.

7. The heat pipe apparatus of claim 1 wherein said heat producing means for said auxiliary evaporator means is disposed about the external wall surfaces of the tubular sleeve.

8. The heat pipe apparatus of claim 7 and further comprising thermal insulation means for enclosing the tubular sleeve and the heat producing means.

* * * * *